United States Patent Office 3,229,720
Patented Jan. 18, 1966

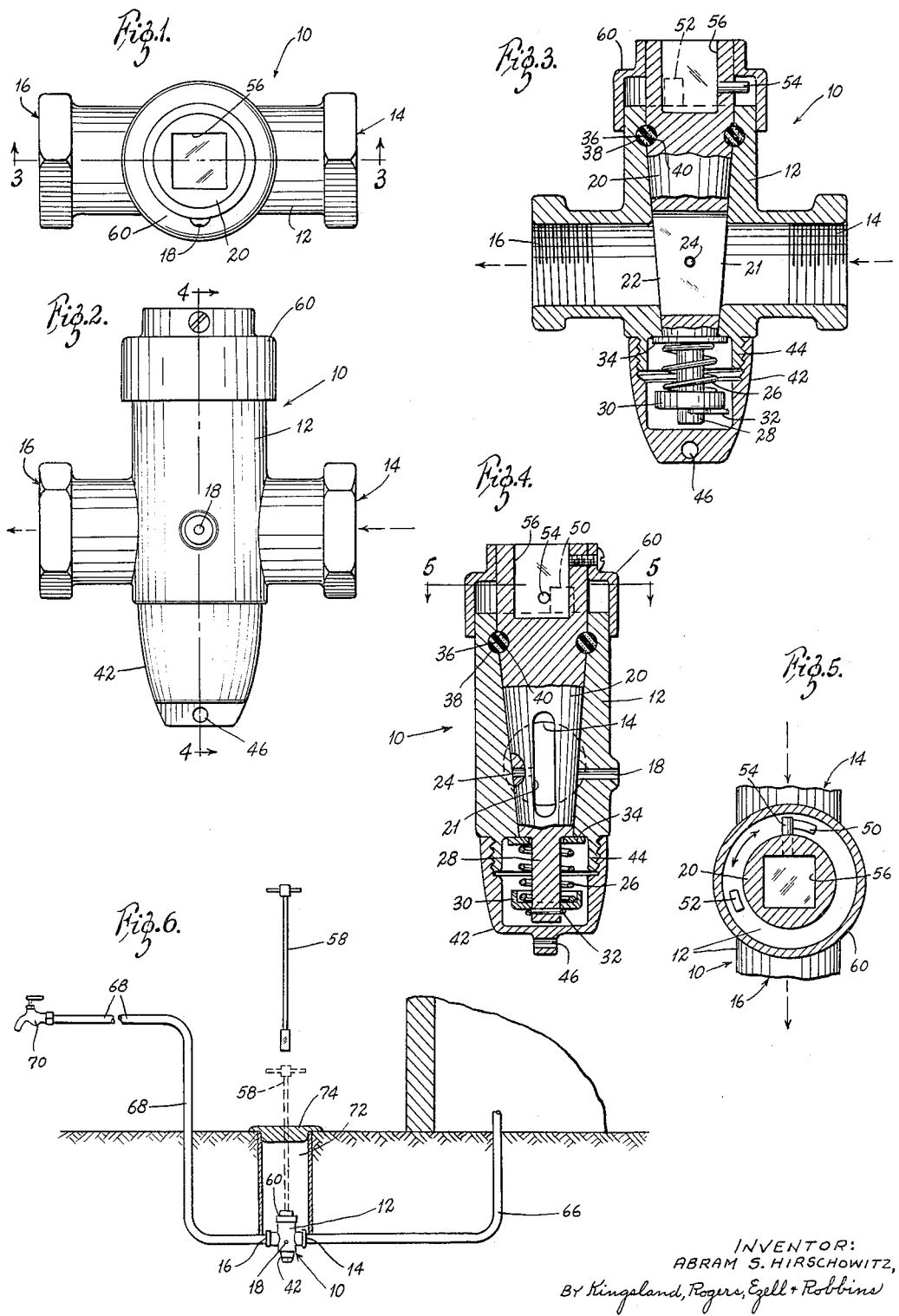

3,229,720
STOP AND WASTE VALVE
Abram S. Hirschowitz, Oran, Mo.
Filed June 10, 1963, Ser. No. 286,550
1 Claim. (Cl. 137—625.22)

This invention relates to improvements in stop and waste valves and in particular is concerned with such a valve having a tapered valve body and special O-ring sealing means and biasing means to maintain the tapered valve element in firm sealing engagement in the valve body. The O-ring also compensates for temperature changes for expansion and contraction and makes for easier operation.

In the past stop and waste valves have been provided in underground valve lines. A particular problem in this field has been due to the effects of corrosion and dirt and debris working into the valve to cause misalignment and leaking of the fluid contents around the valve. Because of the fact that most such valves are buried underneath the ground, such leaking and debris, which is not immediately observed and may take place over a long period of time, is of particular danger as the valve is soon damaged beyond repair and the line in which the valve is employed will be disrupted from service.

By means of this invention there has been provided a stop and waste valve having a valve element of a tapered construction. By virtue of an O-ring sealing means at the top any tendency for leakage is greatly minimized. In addition, a valve biasing spring has been provided at the bottom to bias the tapered valve element into the valve body in firm sealing engagement regardless of wear for which compensation is automatically provided. In addition, a protective cap is provided at the bottom through which a torque rod or handle may be inserted after the valve is removed from the ground so that force may be brought to bear to unscrew the cap should any maintenance or inspection be required. The valve has a special stop pin guiding arrangement at the top such that no hunting for position is required between the limiting opened position and a limiting closed position of the valve.

The above features are objects of this invention and further objects will appear in the detailed description which follows. Further objects will be apparent to those skilled in the art.

For the purpose of illustration of this invention there is shown in the accompanying drawings a preferred embodiment thereof. It is to be understood that these drawings are for the purpose of illustration only and that the invention is not limited thereto.

In the drawings:

FIGURE 1 is a top plan view of the valve;
FIGURE 2 is a view in front elevation of the valve;
FIGURE 3 is a view in section taken on the line 3—3 of FIGURE 1;
FIGURE 4 is a view in section taken on the line 4—4 of FIGURE 2;
FIGURE 5 is a view in section taken on the line 5—5 of FIGURE 4 and;
FIGURE 6 is a view on a reduced scale in vertical section showing the valve connected to a water line.

The valve is generally indicated by the reference numeral 10 and is comprised of a main valve body 12 having an inlet 14 and an outlet 16 for the passage of fluid therethrough while a drain outlet 18 is also provided at the front of the valve as shown in FIGURE 2. A tapered valve element 20 is provided to seat within the valve body and openings 21 and 22 are provided to register with the inlet 14 and the outlet 16, respectively. In addition, the drain opening 24 is provided to provide for communication when the valve element is turned 90° from an opened position between the outlet 16 and the drain outlet 18, while blocking the inlet 14.

A biasing and retaining mechanism is provided at the bottom of the valve, including a compression spring 26 which fits around a guide stem 28 and bears against a washer 30 held in place in the guide stem by a clip 32. The other end of the compression spring bears against a washer 34 fitting against the bottom of the valve body to urge the tapered valve plug downwardly and into firm sealing engagement with the valve body.

A further means to provide for sealing between the valve body and the valve element is effected through an O-ring 36 situated at the top of the valve element and fitting in within a mating groove 38 in the valve body and a groove 40 in the valve element as best shown in FIGURES 3 and 4.

In order to provide for access to the compression spring biasing means, a valve cap 42 for the bottom of the valve, as shown in FIGURES 3 and 4, is provided. This valve cap fits over a threaded nipple 44 so that it may be removed at will. The valve cap also serves as a reservoir for cup grease which is placed therein to lubricate the moving valve parts. In addition, a drilled opening 46 is provided at the end of the cap such that a torque or handle rod may be inserted when the valve is pulled out to provide for a handle means by virtue of which a great force can be brought to bear on the cap to overcome any freezing of the cap to the valve body caused by corrosion or the like.

The top of the valve body, as best shown in FIGURES 1, 3, 4 and 5, is provided with a pair of stop pins 50 and 52, which limit movement of the valve element through a contact by the valve pin 54. This movement is within a 90° range and for the position shown in the drawings the valve is open, but can be moved 90° counterclockwise to provide drainage.

In order to effect movement of the valve element from above the ground, the top of the valve element is provided with a square cross section recess 56, as shown in FIGURES 3, 4 and 5. This cup-shaped recess receives a mating end of an elongated handle 58 as shown in FIGURE 6 to provide for turning of the valve as desired. A protective top valve cap 60 is further provided, where desired, to prevent debris or the like from falling between the stop elements to limit the movement of the valve pin therebetween.

*Use.*—The stop and waste valve 10 of this invention is shown in a typical use system in FIGURE 6. As there shown, it is connected between an inlet supply line 66 leading to a source of water and an outlet line 68 leading to an outside faucet 70. The valve is situated underneath the surface level of the ground and is protected by a cylindrical shell 72 having a removable top 74 for protection.

In the valve position shown in FIGURES 3, 4 and 5, the valve 10 is opened and water will pass through it to the faucet 70, which is opened or closed depending upon service requirements.

During periods of cold weather when it is desired to drain the water from the line 68, the valve 10 may be turned off by rotating the handle 58 90° counterclockwise from the position shown in FIGURE 5. When this is done, the valve opening 22 will be turned out of engagement with the valve outlet 16 and into engagement with the waste opening 18, while the valve drain opening 24 will be turned into communication with the valve opening 16. This permits any water in line 68 to be drained downwardly through the valve and out the waste opening 18. When the valve is turned in this direction, the valve opening 14 will be blocked by the solid portion of the tapered valve plug element.

The construction of the top of the valve with the stop pins 50 and 52 cooperating with the valve pin 54 provides a very convenient guide arrangement and structure. The stops prevent unnecessary hunting for the proper valve opening positions. Further, protection is provided by the cap 60 and through the special construction of the valve, the valve handle 58 may be simply inserted in the top of the valve or withdrawn as required.

As a special feature of this invention, the tapered valve element and the structure of the valve minimizes leakage. Thus, the O-ring 36 provides a top seal between the valve element and the valve body. Likewise, the downward biasing action of the compression spring 26 constantly urges the valve element downward into sealing engagement with the valve body so as to compensate for any wear due to relative movement of the valve parts.

For maintenance and repair, the cap 42 can be simply removed from its protective engagement with the bottom of the valve. When the valve is withdrawn, the protective cap 42 can be removed by inserting a torque rod or handle through the opening 46 in the bottom of the valve so that a great deal of force can be brought to bear to overcome any resistance or freezing of the cap against the bottom of the valve structure. The biasing spring 26 is simple to remove and replace should any such requirement be necessitated.

Various changes and modifications may be made within this invention as will be readily apparent to those skilled in the art. Such changes and modifications are within the scope and teaching of this invention as defined by the claim appended hereto.

What is claimed is:

A valve comprising a housing having an inlet opening, an outlet opening and a waste opening communicating with a tapered valve element receivable in a tapered valve chamber, said valve element having an inlet opening, an outlet opening and a waste opening, said valve element being movable between two limiting positions to provide passage between the valve inlet opening and the outlet opening in a first limiting position and between the valve outlet opening and a waste opening in a second limiting position, said two limiting positions being defined by a pair of vertical stop elements extending above the top of the valve housing, and said valve element having a radially extending member extending between said stop elements and limiting the rotation of the valve member by contact with said stop elements, said valve having biasing means at the bottom for biasing the valve element into firm engagement with the walls of the valve chamber, said biasing means comprising a compression spring bearing at one end against the bottom of the valve housing and bearing at the other end against a washer connected to an elongated member fixed to the bottom of the valve element and extending through the compression spring, and a protective cap fitting over the biasing means in threaded engagement with the bottom of the valve housing, and receiving lubricant to lubricate the moving valve parts, said cap having an extension provided with an opening therein adapted to receive a handle member, and means for sealing the top of the valve element and the valve chamber, said last named means comprising an O-ring fitting in registry grooves in the valve element and the valve chamber.

References Cited by the Examiner

UNITED STATES PATENTS

| 1,398,329 | 11/1921 | King | 137—625.22 |
| 1,664,712 | 4/1928 | Stanley | 251—183 |
| 2,642,257 | 6/1953 | Mueller et al. | 251—183 |

FOREIGN PATENTS 543,733  3/1943  Great Britain.

M. CARY NELSON, *Primary Examiner.*

HENRY T. KLINKSIEK, *Examiner.*